US 11,904,963 B2

(12) United States Patent
Jacobsma et al.

(10) Patent No.: US 11,904,963 B2
(45) Date of Patent: Feb. 20, 2024

(54) MOUNTING BRACKETS FOR AUXILIARY SUSPENSION SYSTEMS

(71) Applicant: Link Mfg., Ltd., Sioux Center, IA (US)

(72) Inventors: Dale E. Jacobsma, Hull, IA (US); Joel D. Van Den Brink, Rock Valley, IA (US); Michael S. Wetter, Orange City, IA (US)

(73) Assignee: Link Mfg., Ltd., Sioux Center, IA (US)

( * ) Notice: Subject to any disclaimer, the term of this patent is extended or adjusted under 35 U.S.C. 154(b) by 0 days.

(21) Appl. No.: 17/956,684

(22) Filed: Sep. 29, 2022

(65) Prior Publication Data

US 2023/0234657 A1 Jul. 27, 2023

Related U.S. Application Data

(62) Division of application No. 17/192,835, filed on Mar. 4, 2021, now Pat. No. 11,485,435, which is a division
(Continued)

(51) Int. Cl.
*B62D 61/12* (2006.01)
*B60G 11/27* (2006.01)
(Continued)

(52) U.S. Cl.
CPC ............ *B62D 61/12* (2013.01); *B60G 5/005* (2013.01); *B60G 11/27* (2013.01); *B60G 11/28* (2013.01);
(Continued)

(58) Field of Classification Search
CPC .......... B62D 61/12; B60G 5/02; B60G 9/003; B60G 2204/44; B60G 11/28
See application file for complete search history.

(56) References Cited

U.S. PATENT DOCUMENTS 2,226,047 A 12/1940 Borgward
3,025,076 A 3/1962 Davies et al.
(Continued)

FOREIGN PATENT DOCUMENTS

BR 102018013922 A2 * 2/2020
CN 106183684 A * 12/2016 ............. B60G 11/27
(Continued)

OTHER PUBLICATIONS

European Patent Office, Partial European Search Report for European Patent Application No. 18195895.0 dated Mar. 20, 2019, 19 pages.
(Continued)

*Primary Examiner* — Nicole T Verley
(74) *Attorney, Agent, or Firm* — Perkins Coie LLP

(57) ABSTRACT

Brackets for mounting auxiliary suspension systems, such as lift axle systems, to vehicles are disclosed herein. For example, brackets are disclosed for attaching lift axle hanger brackets and lift axle load springs to corresponding frame members. In some embodiments, the frame brackets can include physical features (e.g., a series of graduated steps in an edge portion thereof) to facilitate visual alignment of the lift axle with the vehicle frame members during installation. In other embodiments, the frame brackets can be two-piece brackets that enable the load springs to be removed and replaced without having to detach the frame bracket from the frame rail.

20 Claims, 9 Drawing Sheets

Related U.S. Application Data of application No. 16/137,390, filed on Sep. 20, 2018, now Pat. No. 10,967,927.

(60) Provisional application No. 62/562,210, filed on Sep. 22, 2017.

(51) Int. Cl.
| | |
|---|---|
| *B60G 5/00* | (2006.01) |
| *B60G 11/28* | (2006.01) |
| *B60G 17/005* | (2006.01) |
| *B62D 21/02* | (2006.01) |

(52) U.S. Cl.
CPC ...... *B60G 17/005* (2013.01); *B60G 2202/152* (2013.01); *B60G 2204/126* (2013.01); *B60G 2204/43* (2013.01); *B60G 2204/44* (2013.01); *B60G 2204/4702* (2013.01); *B60G 2206/601* (2013.01); *B60G 2300/0262* (2013.01); *B60G 2300/402* (2013.01); *B62D 21/02* (2013.01)

(56) References Cited

U.S. PATENT DOCUMENTS

| | | | |
|---|---|---|---|
| 3,116,071 A | 12/1963 | Wilfert | |
| 3,246,716 A | 4/1966 | Kozicki | |
| 3,315,981 A | 4/1967 | Behles | |
| 3,575,441 A | 4/1971 | Arning | |
| 3,630,541 A | 12/1971 | Carlson | |
| 3,653,683 A | 4/1972 | Hendrickson | |
| 3,730,548 A | 5/1973 | Thaxton | |
| 3,733,087 A | 5/1973 | Allison | |
| 3,850,445 A | 11/1974 | Borns et al. | |
| 3,895,818 A | 7/1975 | Fearon | |
| 3,992,036 A | 11/1976 | Allison | |
| 4,072,322 A | 2/1978 | Fuchs et al. | |
| 4,146,249 A | 3/1979 | Paul | |
| 4,267,896 A | 5/1981 | Hendriksen | |
| 4,350,358 A | 9/1982 | Ferris | |
| 4,382,604 A | 5/1983 | Nakagawa | |
| 4,390,187 A | 6/1983 | Maeda | |
| 4,415,179 A | 11/1983 | Marinelli | |
| 4,458,915 A | 7/1984 | Emery | |
| 4,518,171 A | 5/1985 | Hedenberg | |
| 4,736,964 A | 4/1988 | Specktor | |
| 4,756,550 A | 7/1988 | Raidel | |
| 4,759,567 A | 7/1988 | Allen | |
| 4,792,148 A | 12/1988 | Hintz | |
| 4,802,690 A | 2/1989 | Raidel | |
| 4,809,960 A | 3/1989 | Kakimoto et al. | |
| 4,856,814 A | 8/1989 | Jones | |
| 4,869,527 A | 9/1989 | Coddens | |
| 4,900,057 A | 2/1990 | Raidel | |
| 4,934,667 A | 6/1990 | Pees et al. | |
| 5,018,756 A | 5/1991 | Mitchell | |
| 5,029,885 A | 7/1991 | Steiner | |
| 5,058,867 A | 10/1991 | Hadano et al. | |
| 5,083,812 A | 1/1992 | Wallace et al. | |
| 5,163,699 A | 11/1992 | Specktor | |
| 5,230,528 A | 7/1993 | Van Raden et al. | |
| 5,251,926 A | 10/1993 | Aulerich et al. | |
| 5,265,907 A * | 11/1993 | Tostado | B60G 11/28 |
| | | | 280/124.157 |
| 5,301,977 A | 4/1994 | Schlosser et al. | |
| 5,328,160 A | 7/1994 | McLauglin | |
| 5,362,093 A | 11/1994 | Klosterhuber et al. | |
| 5,368,326 A | 11/1994 | Turck et al. | |
| 5,398,411 A | 3/1995 | Kusaka et al. | |
| 5,403,031 A * | 4/1995 | Gottschalk | B62D 17/00 |
| | | | 280/86.753 |
| 5,452,919 A | 9/1995 | Hoyle et al. | |
| 5,505,481 A | 4/1996 | Vandenberg et al. | |
| 5,505,482 A | 4/1996 | Vandenberg | |
| 5,509,684 A | 4/1996 | Yarrow et al. | |
| 5,579,860 A | 12/1996 | Halverson et al. | |
| 5,678,845 A | 1/1997 | Stuart | |
| 5,692,767 A | 12/1997 | Kato | |
| 5,785,345 A | 7/1998 | Barlas et al. | |
| 5,820,156 A | 10/1998 | Vandenberg | |
| 5,882,031 A | 3/1999 | Vandenberg | |
| 5,924,712 A | 7/1999 | Pierce | |
| 5,944,339 A | 8/1999 | McKenzie et al. | |
| 5,988,672 A | 11/1999 | Vandenberg | |
| 6,073,946 A | 6/2000 | Richardson | |
| 6,073,947 A | 6/2000 | Gottschalk et al. | |
| 6,131,930 A * | 10/2000 | Chalin | B60G 9/02 |
| | | | 280/86.75 |
| 6,135,470 A * | 10/2000 | Dudding | B60G 21/05 |
| | | | 280/124.171 |
| 6,158,750 A | 12/2000 | Gideon et al. | |
| 6,311,993 B1 * | 11/2001 | Hulstein | B62D 61/125 |
| | | | 280/86.75 |
| 6,312,006 B1 | 11/2001 | Svensson | |
| 6,328,322 B1 | 12/2001 | Pierce | |
| 6,367,826 B1 | 4/2002 | Klals | |
| 6,398,236 B1 | 6/2002 | Richardson | |
| 6,416,069 B1 | 7/2002 | Ramsey | |
| 6,502,837 B1 | 1/2003 | Hamilton et al. | |
| 6,527,286 B2 | 3/2003 | Keeler et al. | |
| 6,607,205 B2 | 8/2003 | Platner | |
| 6,622,996 B2 | 9/2003 | Mayerbock et al. | |
| 6,659,479 B1 | 12/2003 | Raidel | |
| 6,758,648 B1 | 7/2004 | Eekhoff et al. | |
| 6,808,035 B1 | 10/2004 | Keeler | |
| 6,808,192 B1 | 10/2004 | Bol | |
| 6,832,143 B2 | 12/2004 | Trudeau et al. | |
| 6,834,873 B1 | 12/2004 | Vander Kooi et al. | |
| 6,845,989 B2 | 1/2005 | Fulton et al. | |
| 6,851,687 B2 | 2/2005 | Klais | |
| 6,851,689 B2 | 2/2005 | Dudding et al. | |
| 6,859,989 B2 | 3/2005 | Bauer et al. | |
| 6,871,864 B2 | 3/2005 | Reineck | |
| 6,880,839 B2 | 4/2005 | Keeler et al. | |
| 6,886,266 B2 | 5/2005 | Kidd et al. | |
| 6,886,840 B2 | 5/2005 | Reineck | |
| 6,932,401 B1 | 8/2005 | Eekhoff et al. | |
| 6,945,548 B2 * | 9/2005 | Dudding | B60G 7/04 |
| | | | 267/66 |
| 7,014,237 B1 | 3/2006 | Eekhoff et al. | |
| 7,083,176 B2 | 8/2006 | Soles et al. | |
| 7,182,354 B2 | 2/2007 | Dudding | |
| 7,216,925 B1 | 5/2007 | Abele et al. | |
| 7,234,713 B1 | 6/2007 | Vander Kooi et al. | |
| 7,261,304 B2 | 8/2007 | Trudeau et al. | |
| 7,281,721 B2 | 10/2007 | Hudson et al. | |
| 7,293,781 B2 | 11/2007 | Power et al. | |
| 7,296,809 B2 | 11/2007 | Zebolsky | |
| 7,303,200 B2 | 12/2007 | Ramsey | |
| 7,331,588 B2 | 2/2008 | Johnson | |
| 7,331,627 B2 | 2/2008 | Van Den Brink et al. | |
| 7,389,994 B2 | 6/2008 | Trudeau et al. | |
| 7,392,996 B2 * | 7/2008 | Mattocks | B60G 9/00 |
| | | | 280/5.521 |
| 7,416,190 B2 | 8/2008 | Sandbulte et al. | |
| 7,464,948 B2 | 12/2008 | Ramsey | |
| 7,481,441 B2 | 1/2009 | Kirkham | |
| 7,503,414 B2 | 3/2009 | Pierce et al. | |
| 7,503,586 B2 | 3/2009 | Ramsey | |
| 7,530,577 B2 | 5/2009 | Sandbulte et al. | |
| 7,549,660 B2 | 6/2009 | Ramsey | |
| 7,568,710 B2 | 8/2009 | Ramsey | |
| 7,600,785 B2 | 10/2009 | Ramsey | |
| 7,607,670 B2 | 10/2009 | Raidel, II et al. | |
| 7,658,412 B2 * | 2/2010 | Ramsey | B60G 7/02 |
| | | | 280/784 |
| 7,661,916 B2 | 2/2010 | Downey | |
| 7,690,660 B2 | 4/2010 | Dudding et al. | |
| 7,731,211 B2 | 6/2010 | Ramsey | |
| 7,735,516 B2 | 6/2010 | Morris | |
| 7,766,352 B2 | 8/2010 | Keeler | |
| 7,789,405 B2 | 9/2010 | Lie | |
| 7,887,065 B2 | 2/2011 | Trudeau et al. | |
| 7,891,679 B2 | 2/2011 | Svartz et al. | |
| 7,966,685 B2 | 6/2011 | Van Beek et al. | |

(56) References Cited

U.S. PATENT DOCUMENTS

| | | |
|---|---|---|
| 8,177,246 B2 | 5/2012 | Cortez et al. |
| 8,192,106 B2 | 6/2012 | Vogler et al. |
| 8,302,988 B2 | 11/2012 | Noble |
| 8,371,596 B2 | 2/2013 | Johnson et al. |
| 8,403,346 B2 | 3/2013 | Chalin et al. |
| 8,413,997 B1 | 4/2013 | Coombs et al. |
| 8,459,400 B2 | 6/2013 | Dillard |
| 8,496,259 B2 * | 7/2013 | Ramsey ............... B62D 53/068 180/209 |
| 8,523,207 B2 * | 9/2013 | Dodd ..................... B60G 9/00 180/209 |
| 8,523,208 B2 * | 9/2013 | Rezania ................ B60G 7/001 280/681 |
| 8,573,611 B1 | 11/2013 | Jensen |
| 8,590,912 B2 | 11/2013 | McCarthy et al. |
| 8,622,406 B2 | 1/2014 | Eveley |
| 8,641,062 B2 | 2/2014 | Gottschalk |
| 8,967,638 B2 | 3/2015 | Gottschalk |
| 8,967,646 B2 | 3/2015 | Schwarz et al. |
| 8,979,105 B2 | 3/2015 | McCarthy et al. |
| D727,219 S | 4/2015 | Winter et al. |
| 9,139,061 B2 | 9/2015 | Delorenzis |
| 9,157,529 B2 | 10/2015 | Westnedge et al. |
| 9,233,589 B1 | 1/2016 | Miller |
| 9,290,221 B2 | 3/2016 | Conaway et al. |
| 9,315,083 B2 * | 4/2016 | Noble ..................... B60G 9/02 |
| 9,315,222 B1 * | 4/2016 | Wetter ..................... B60G 9/02 |
| 9,340,242 B1 | 5/2016 | Hartmann et al. |
| 9,352,628 B2 | 5/2016 | Barton et al. |
| 9,358,854 B1 | 6/2016 | Sandbulte et al. |
| 9,422,014 B1 | 8/2016 | Schuck |
| 9,481,416 B2 | 11/2016 | Conaway et al. |
| 9,688,318 B1 | 6/2017 | Wetter et al. |
| 9,707,999 B2 * | 7/2017 | Spielmann ............ B60G 9/003 |
| 9,829,060 B2 | 11/2017 | Batsch et al. |
| 9,937,766 B1 | 4/2018 | Bobb et al. |
| 10,538,135 B2 | 1/2020 | Hemmler |
| 10,543,730 B2 | 1/2020 | Davis et al. |
| 10,569,813 B2 | 2/2020 | Davis et al. |
| 10,569,814 B2 | 2/2020 | Hulstein et al. |
| D897,911 S | 10/2020 | Winter et al. |
| D897,912 S | 10/2020 | Winter et al. |
| 10,967,927 B2 | 4/2021 | Jacobsma et al. |
| 11,130,379 B2 | 9/2021 | Miller et al. |
| 11,335,287 B2 | 5/2022 | Chang |
| 11,338,865 B2 | 5/2022 | Davis et al. |
| 11,370,498 B1 | 6/2022 | Herman et al. |
| 11,485,435 B2 | 11/2022 | Jacobsma et al. |
| 2001/0007419 A1 | 7/2001 | Tanaka |
| 2001/0013691 A1 | 8/2001 | Hosoya |
| 2001/0052685 A1 * | 12/2001 | Svartz .................. B60G 11/465 280/124.163 |
| 2002/0180173 A1 | 12/2002 | Daily et al. |
| 2003/0057622 A1 | 3/2003 | Bovio et al. |
| 2003/0111810 A1 | 6/2003 | Fulton et al. |
| 2003/0151222 A1 | 8/2003 | Sutton et al. |
| 2003/0193149 A1 | 10/2003 | Russell et al. |
| 2003/0214118 A1 | 11/2003 | Pavuk |
| 2004/0007844 A1 | 1/2004 | Reineck |
| 2004/0056446 A1 | 3/2004 | Dudding et al. |
| 2004/0084866 A1 | 5/2004 | Ramsey |
| 2004/0178594 A1 | 9/2004 | Keeler et al. |
| 2004/0188973 A1 | 9/2004 | Molitor |
| 2004/0256820 A1 | 12/2004 | Chalin et al. |
| 2005/0001397 A1 | 1/2005 | Genick |
| 2005/0146110 A1 | 7/2005 | Dudding |
| 2005/0156398 A1 | 7/2005 | Ramsey |
| 2005/0161896 A1 | 7/2005 | Reineck |
| 2006/0001311 A1 | 1/2006 | Platner et al. |
| 2006/0157309 A1 | 7/2006 | Chalin et al. |
| 2006/0181043 A1 * | 8/2006 | Zebolsky ............... B60G 9/003 280/86.754 |
| 2007/0126263 A1 * | 6/2007 | Ramsey ................... B60G 7/02 296/203.01 |
| 2008/0012261 A1 | 1/2008 | Ramsey |
| 2008/0084047 A1 | 4/2008 | Bluff et al. |
| 2008/0184623 A1 | 8/2008 | Heigl et al. |
| 2008/0185549 A1 | 8/2008 | Steinbuchel et al. |
| 2009/0200718 A1 | 8/2009 | Roemer et al. |
| 2009/0206570 A1 | 8/2009 | Strong |
| 2010/0253032 A1 | 10/2010 | Ramsey |
| 2010/0283581 A1 | 11/2010 | Heigl |
| 2011/0035104 A1 | 2/2011 | Smith |
| 2012/0284973 A1 | 11/2012 | Glaser et al. |
| 2013/0062852 A1 * | 3/2013 | Dodd ..................... B60G 9/00 280/124.1 |
| 2013/0087984 A1 | 4/2013 | Gottschalk |
| 2013/0154225 A1 | 6/2013 | Johnson et al. |
| 2014/0125029 A1 | 5/2014 | VanDenberg et al. |
| 2015/0137463 A1 | 5/2015 | McLennan et al. |
| 2015/0266375 A1 | 9/2015 | Tavvala et al. |
| 2015/0273972 A1 | 10/2015 | Plath |
| 2015/0336436 A1 | 11/2015 | Barton et al. |
| 2016/0046163 A1 | 2/2016 | Layne et al. |
| 2016/0152106 A1 | 6/2016 | Preijert |
| 2016/0272025 A1 | 9/2016 | McComsey et al. |
| 2017/0016757 A1 | 1/2017 | Strong et al. |
| 2017/0225729 A1 | 8/2017 | Yakimishyn |
| 2018/0015815 A1 | 1/2018 | Makino et al. |
| 2018/0222274 A1 | 8/2018 | Davis et al. |
| 2018/0319451 A1 | 11/2018 | Smith |
| 2019/0054816 A1 | 2/2019 | Garcia et al. |
| 2019/0061847 A1 | 2/2019 | Barton et al. |
| 2019/0077468 A1 | 3/2019 | Hulstein et al. |
| 2023/0010068 A1 | 1/2023 | Davis et al. |

FOREIGN PATENT DOCUMENTS

| | | | | |
|---|---|---|---|---|
| CN | 108891218 A | * | 11/2018 | ............ B60G 11/27 |
| CN | 209649983 U | * | 11/2019 | |
| CN | 210478326 U | * | 5/2020 | |
| CN | 210478327 U | * | 5/2020 | |
| CN | 112848827 A | * | 5/2021 | ............ B60G 11/27 |
| CN | 217099591 U | * | 8/2022 | |
| DE | 102011001431 A1 | * | 9/2012 | ............ B60G 11/28 |
| DE | 102011001431 A1 | | 9/2012 | |
| DE | 102013003300 A1 | * | 8/2014 | ............ B21D 17/02 |
| EP | 0867315 B1 | | 2/2007 | |
| EP | 2385269 A2 | * | 11/2011 | ............ B60G 11/28 |
| EP | 1957344 B1 | | 12/2012 | |
| JP | 3374503 B2 | * | 2/2003 | |
| JP | 3374503 B2 | | 2/2003 | |
| JP | 3196517 U | * | 3/2015 | |
| WO | 2006071172 A1 | | 7/2006 | |
| WO | 2006093458 A1 | | 9/2006 | |
| WO | 2010132692 A1 | | 11/2010 | |
| WO | 2014131399 A1 | | 9/2014 | |
| WO | WO-2020047028 A1 | * | 3/2020 | ........... B60B 35/007 |
| WO | 2022108444 A2 | | 5/2022 | |

OTHER PUBLICATIONS

European Patent Office, Extended European Search Report for European Patent Application No. 18195895.0, dated Aug. 1, 2019, 22 pages.
European Patent Office, Communication pursuant to Article 94(3) EPC, Examination Report, dated Apr. 21, 2020 for European Patent Application No. 18195895.0, 9 pages.
European Patent Office, Communication pursuant to Article 94(3) EPC, Examination Report, dated Apr. 7, 2021 for European Patent Application No. 18195895.0 filed Sep. 21, 2018, 4 pages.
European Patent Office, Communication pursuant to Article 94(3) EPC, Examination Report, dated Apr. 5, 2022 for European Patent Application No. 18195895.0 filed Sep. 21, 2018, 5 pages.
European Patent Office, Communication pursuant to Article 94(3) EPC, Examination Report, dated Aug. 22, 2022 for European Patent Application No. 18195895.0 filed Sep. 21, 2018, 5 pages.
Tuthill Transport Technologies advertisement for Model 345P Super Duty Air Suspension, Year: 1999.
Ridewell Suspensions advertisement for Model RAD-227WB suspension, Year: 2001.

(56) References Cited

OTHER PUBLICATIONS

Link Manufacturing Ltd., Air Control Kit (1350-1004), Installation Instructions Parts List; Jan. 14, 2016, 4 pages.

* cited by examiner

MOUNTING BRACKETS FOR AUXILIARY SUSPENSION SYSTEMS

CROSS-REFERENCE TO RELATED APPLICATIONS INCORPORATED BY REFERENCE

This application is a divisional of U.S. patent application Ser. No. 17/192,835 filed Mar. 4, 2021, now issued as U.S. Pat. No. 11,485,435, and titled "MOUNTING BRACKETS FOR AUXILIARY SUSPENSION SYSTEMS," which is a divisional of U.S. patent application Ser. No. 16/137,390, filed Sep. 20, 2018, now issued as U.S. Pat. No. 10,967,927, and titled "MOUNTING BRACKETS FOR AUXILIARY SUSPENSION SYSTEMS," which claims the benefit of and priority to U.S. Provisional Patent Application No. 62/562,210, filed Sep. 22, 2017, and titled "MOUNTING BRACKETS FOR AUXILIARY SUSPENSION SYSTEMS," the disclosures of which are incorporated herein by reference in their entirety.

TECHNICAL FIELD

The present disclosure relates generally to brackets for attaching auxiliary suspension systems to the frames of trucks, trailers, and other heavy-lift vehicles.

BACKGROUND

Many heavy-duty trucks are designed to carry a wide range of loads that vary depending on the type or amount of cargo they may be carrying. To carry the full range of loads, some trucks include one or more non-drive rear axles in conjunction with one or more drive axles. The non-drive rear axles may be needed for a variety of reasons, such as to comply with suspension and tire load ratings, bridge laws, etc. When the truck is unloaded, the non-drive axle is just "along for the ride," since it is not needed to carry any load in that condition. For this reason, many trucks use non-drive axles that can be lifted off of the ground and into a stored position (the "lifted position" or "raised position") when not needed. This type of axle is often referred to as a "lift axle," a "liftable axle," an "auxiliary axle," and/or an "auxiliary suspension system." By raising the lift axle when the vehicle is lightly loaded, wear on the lift axle tires can be reduced and fuel economy can be increased due to the absence of rolling resistance from the lift axle tires.

Lift axles can be installed ahead of or behind a drive axle on a straight truck or tractor. If a lift axle is positioned ahead of the drive axle, the lift axle is referred to as a "pusher." If the lift axle is positioned behind the drive axle, it is referred to as a "tag." Lift axles can also be installed ahead of or behind an axle or tandem axles on an articulating trailer. There are both steerable and non-steerable lift axles. As the name implies, the wheels on a non-steerable lift axle cannot turn left or right, and as a result non-steerable lift axles need to be raised prior to turning a tight corner or the tires will scuff and impose high lateral stresses on the wheels and other chassis components. In contrast, steerable lift axles include wheels that can caster so they turn and can remain in contact with the ground during tight turning. Various lift axle systems and associated components are described in U.S. Pat. No. 5,403,031 to Gottschalk et al., U.S. Pat. No. 6,073,947 to Gottschalk et al., U.S. Pat. No. 6,311,993 to Holstein et al., U.S. Pat. No. 6,880,839 to Keeler et al., U.S. Pat. No. 9,352,628 to Barton et al., and U.S. Pat. No. 9,688,318 to Wetter et al., each of which is incorporated herein by reference in its entirety.

Lift axle systems are typically attached to the chassis of a truck or other vehicle by a set of brackets. For example, some lift axle systems include two forward hanger brackets that pivotally support the lift axle, and two rearward load springs (e.g., air springs) that are mounted to the lift axle. Such lift axle systems can be attached to the vehicle chassis by two forward brackets and two rear brackets. The two forward brackets attach the two hanger brackets to the two longitudinal frame members, and the two rear brackets attach the two load springs to the two frame members. Often, however, it may be necessary or desirable to adjust the left-to-right position of the lift axle relative to the vehicle frame during installation (or subsequent service) to ensure proper alignment of the axle. Additionally, it may also be necessary or desirable to remove and replace one of load springs without having to detach and then reinstall the corresponding rear frame bracket.

FIG. 1 is an isometric view of a portion of a lift axle system 110 having a hanger bracket 104 attached to a vehicle frame member 102 by a bracket 106 configured in accordance with the prior art. Although FIG. 1 illustrates the right (or passenger) side of the vehicle, it will be understood that a mirror image arrangement of the hanger bracket 104, the bracket 106, and the frame member 102 exists on the left (or driver) side of the vehicle as well. The bracket 106 includes an upstanding flange that is attached to the frame member 102 by a plurality of bolts 108, and a horizontal flange that is attached to the hanger bracket 104 by a pair of bolts 118 that extend through elongated holes 114. It will be noted that both ends of the upper surface of the hanger bracket 104 include a plurality of graduated lines or "tick marks" 112 directly adjacent to an outer edge portion 116 of the bracket 106. When installing the lift axle system 110 on the vehicle with the bolts 118 not fully tightened, the elongated holes 114 enable the lift axle system 110 to be moved back and forth in the lateral direction S to center the lift axle system 110 relative to the vehicle frame. When in position, the installers can verify that the lift axle system 110 is properly aligned by visually inspecting the relative positions of the outer edge portions 116 of the left and right brackets 106 relative to the respective tick marks 112 on the hanger brackets 104.

DETAILED DESCRIPTION

Figure 1:
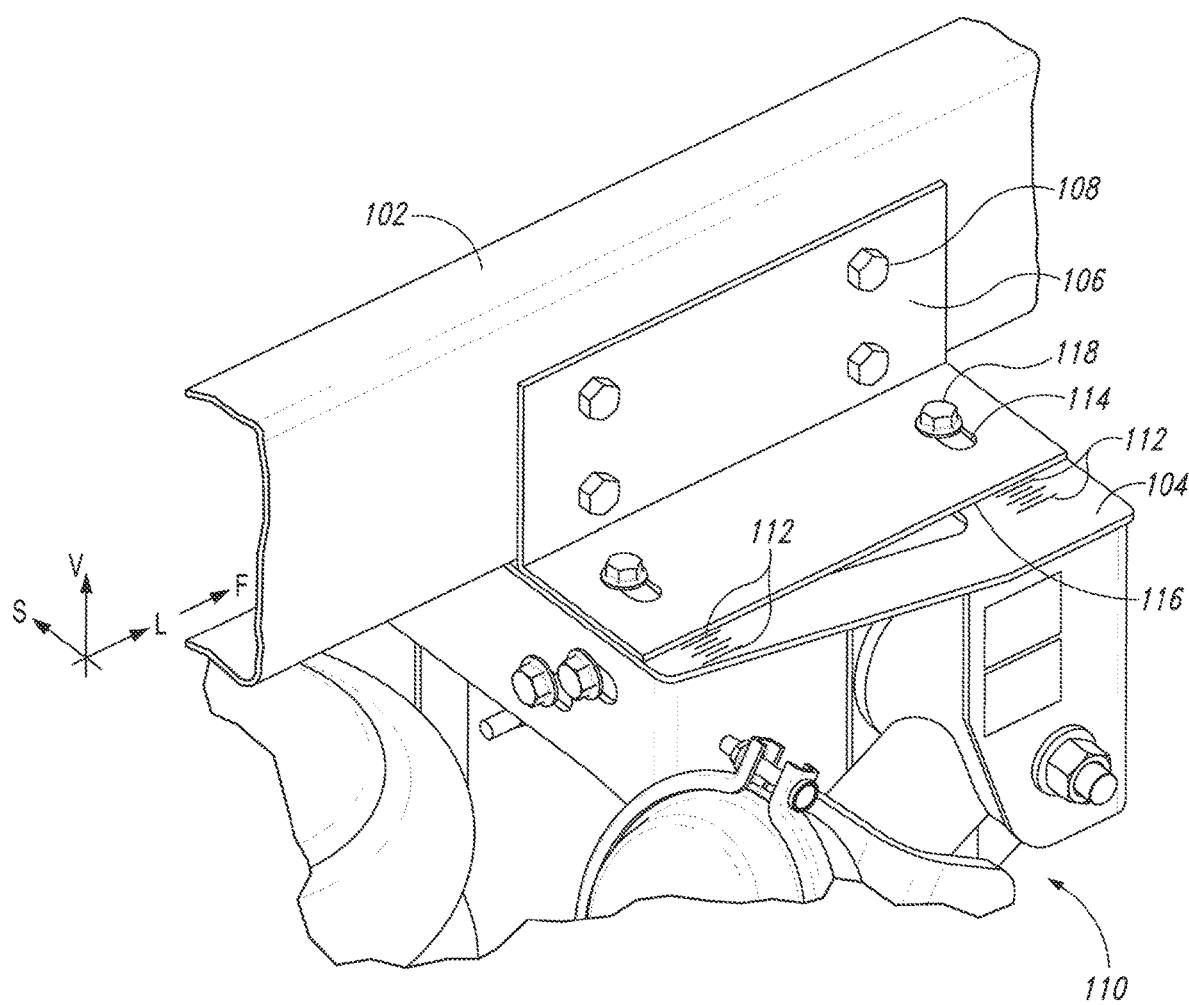
FIG. 1 is an isometric view of lift axle hanger bracket configured in accordance with the prior art.

The following disclosure describes various embodiments of brackets and other structures for attaching lift axle systems and other auxiliary suspension systems to the chassis of heavy-duty trucks, trailers, and/or other vehicles, and associated methods of manufacture and use. Auxiliary suspension system mounting brackets configured in accordance with the present technology can include forward brackets for attaching axle hanger brackets to longitudinal frame members of a vehicle, and rear brackets for attaching axle load springs to the frame members. In some embodiments, the forward frame brackets can include physical features that facilitate lateral alignment of the axle relative to the vehicle frame during installation. These physical features can include, for example, an outer edge portion of each bracket that includes a series of graduated steps. When the axle is first installed, the stepped edge portion of each bracket is positioned adjacent to a locating surface or other prominent feature of the corresponding hanger bracket. Alignment of the axle can then be readily achieved by visually confirming that the relative position of each of the hanger brackets with respect to the graduated steps on the corresponding frame bracket is the same on both sides of the axle. If not, the axle can be moved from one side to the other as needed to center the axle while the attachment fasteners are slightly loose, and then the attachment fasteners can be fully torqued to their final setting.

In other embodiments, rear frame brackets configured in accordance with the present technology are two-piece brackets having a base portion that is attached to an upper portion of a load spring, and an upper or upstanding portion that is attached to the adjacent frame member. If desired or necessary, the base portion can be disconnected from the upstanding portion while the base portion remains attached to the load spring and the upstanding portion remains attached to the frame member. This enables the load spring to be removed from the axle and replaced or serviced without first having to remove the frame bracket from the frame member.

Certain details are set forth in the following description and in FIGS. 2-7B to provide a thorough understanding of various embodiments of the present technology. In other instances, well-known structures, systems, materials and/or methods often associated with lift axles systems, metal bracketry, heavy duty trucks and other vehicles, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these elements may be arbitrarily enlarged to improve legibility. In some instances, component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will appreciate that further embodiments of the invention can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 210 is first introduced and discussed with reference to FIG. 2.

Figure 2:
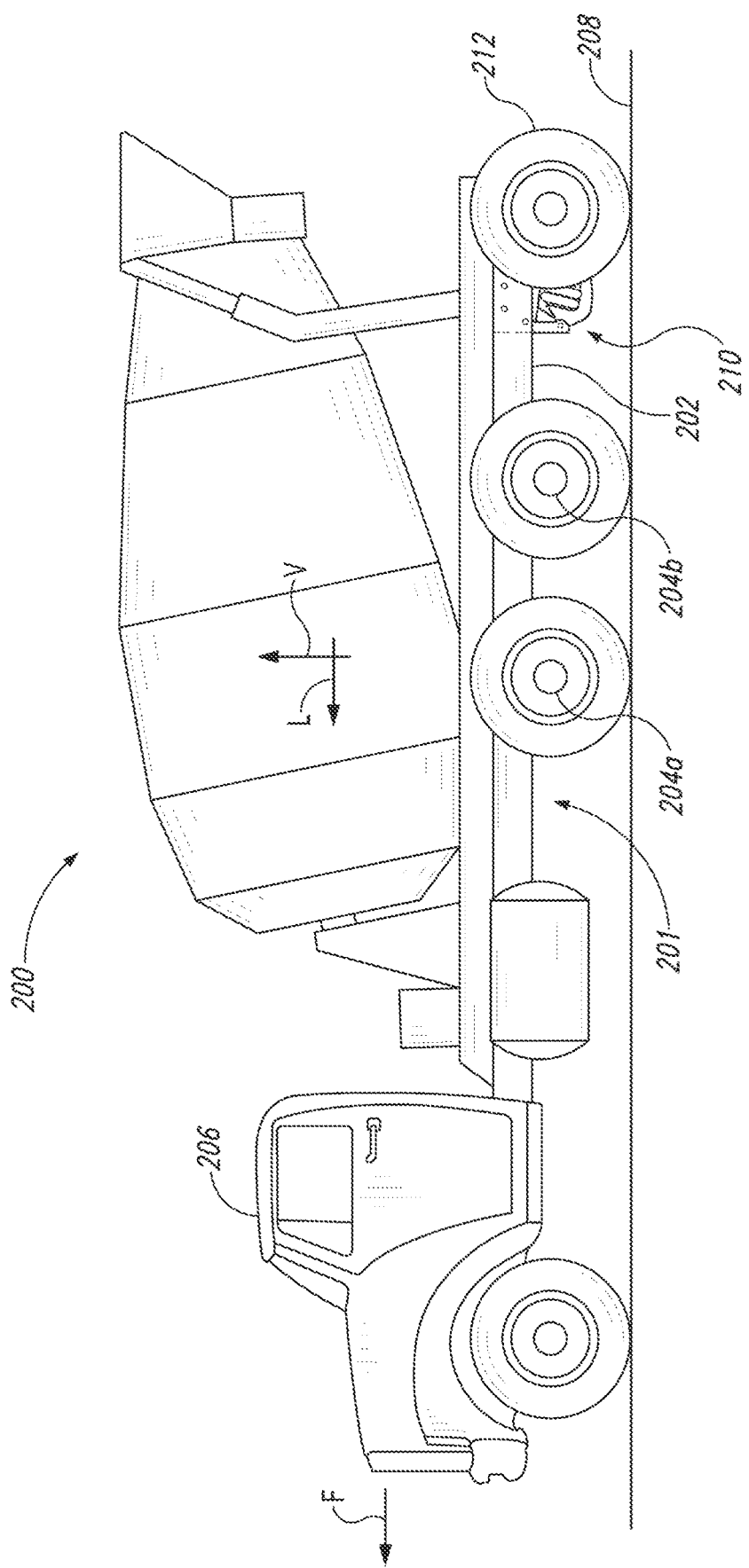
FIG. 2 is a side view of a vehicle having a lift axle system mounted to the vehicle chassis with frame brackets configured in accordance with embodiments of the present technology.

FIG. 2 is a left side (i.e., driver's side) view of a heavy-duty vehicle 200 having an auxiliary suspension system 210 attached to a chassis 201 with brackets configured in accordance with embodiments of the present technology. In the illustrated embodiment, the auxiliary suspension system 210 is a lift axle system, and may be referred to hereinafter as the lift axle system 210. However, it will be understood that embodiments of the apparatuses, systems and methods described herein can be used with other auxiliary suspension systems including, for example, non-lifting axles. The vehicle 200 includes a cab 206 mounted to the chassis 201. The chassis 201 has two laterally spaced-apart, longitudinally extending frame members 202, although only one frame member 202 can be seen in the side view of FIG. 2. In the illustrated embodiment, the lift axle system 210 is attached to the frame members 102 behind tandem axles 204a and 204b in a "tag" configuration. One or both of the axles 204 can be drive axles. In other embodiments, the lift axle system 210 can be positioned between the cab 206 and the axles 204 in a "pusher" configuration. Auxiliary axle systems (including both lift and non-lift axles) configured in accordance with the present technology can be used with single drive axles, double drive axles, triple drive axles, etc. The lift axle system 210 includes one or more wheels 212 rotatably mounted on opposite sides thereof in a conventional manner. In operation, the lift axle system 210 can raise the wheels 212 off of the ground 208 when the additional support of the lift axle is not needed, and lower the wheels 212 into contact with the ground 208 as shown in FIG. 2 when the extra support of the lift axle system 210 is needed or desired.

For directional reference in the discussion that follows, it will be understood that the vehicle 200 is pointed in a forward direction F and is aligned with a longitudinal axis L. Additionally, it will be understood that a vertical axis V extends upwardly at a right angle to the longitudinal axis L, and that a lateral axis S (not shown in FIG. 2) extends horizontally transverse to the longitudinal axis L. Although the vehicle 200 is depicted as a concrete mixer for purposes of illustration, the lift axle systems described herein can be used with virtually any type of heavy duty vehicle including, for example, other types of trucks, trailers, etc., in both "tag" and "pusher" configurations, and with both steerable and non-steerable axles. Accordingly, the various embodiments of the present technology described herein are not limited to use with any particular type of vehicle or in any particular type of axle arrangement unless specifically noted otherwise herein.

Figure 3A:
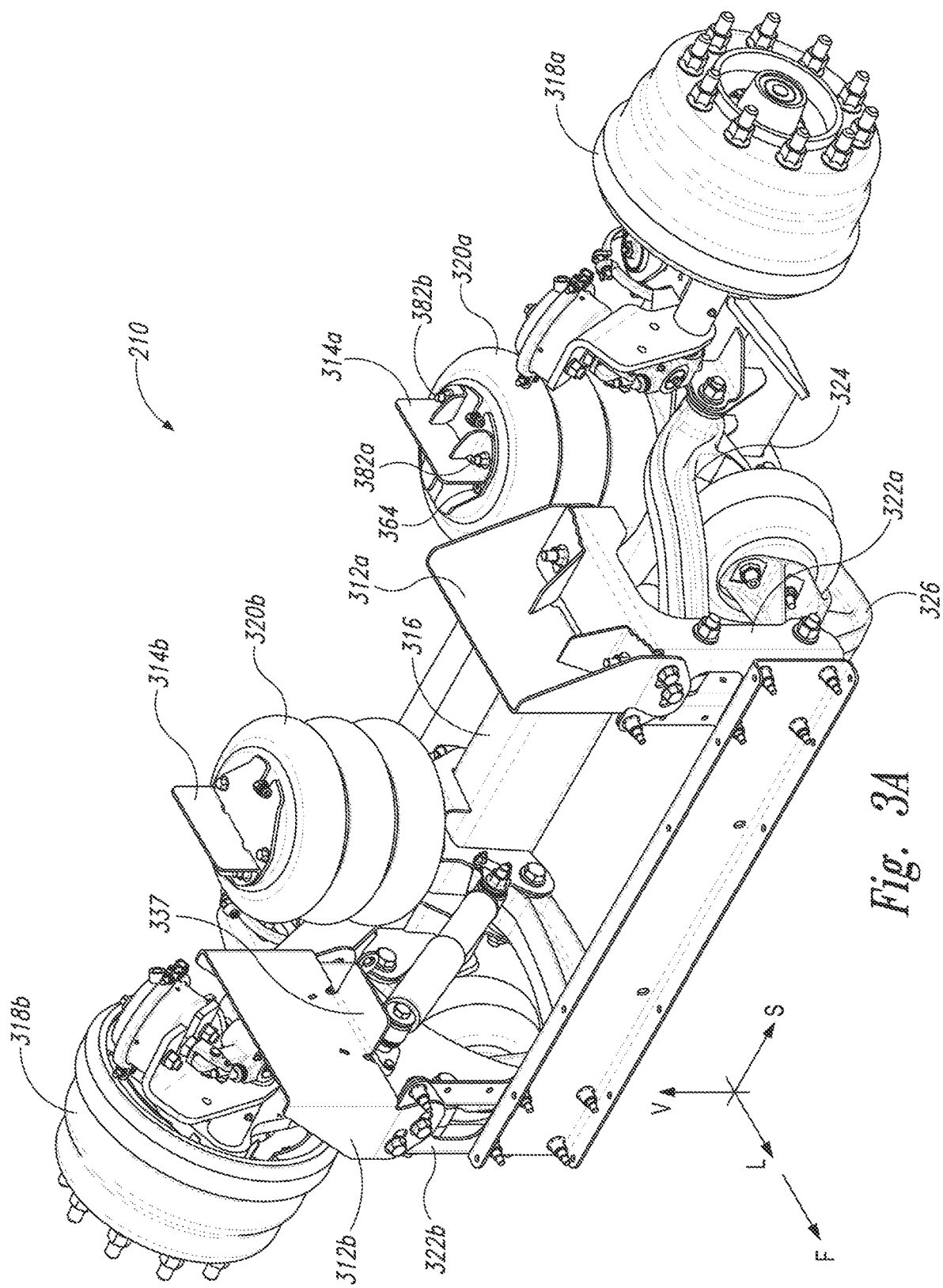
FIG. 3A is an isometric view of a lift axle system having frame brackets configured in accordance with embodiments of the present technology.
Figure 3B:
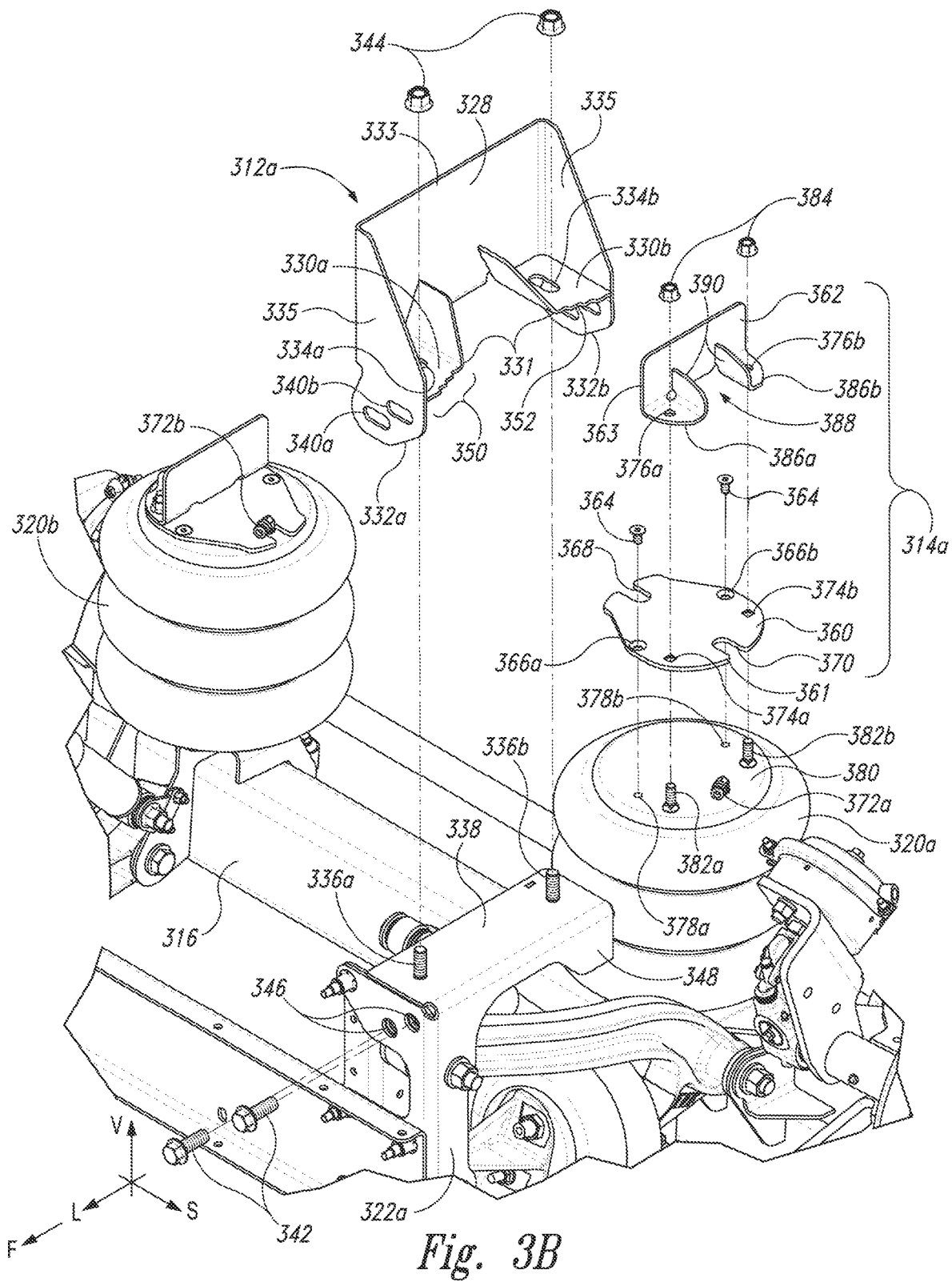
FIG. 3B is a partially exploded isometric view of the frame brackets.

FIG. 3A is an isometric view of a lift axle system 210 having a set of frame brackets 312 and 314 configured in accordance with embodiments of the present technology, and FIG. 3B is a partially exploded isometric view of the frame brackets 312 and 314 on the left side of the lift axle system 210. Referring first to FIG. 3A, in the illustrated embodiment the lift axle system 210 includes an axle 316 having wheel hubs 318 (identified individually as a first wheel hub 318a and a second wheel hub 318b) rotatably mounted to opposite end portions thereof in a conventional manner. Although not shown in FIGS. 3A and 3B, wheels can be mounted to the hubs 318 in a conventional manner. The lift axle system 210 further includes a first hanger bracket 322a positioned toward the left side of the vehicle, and a second hanger bracket 322b positioned toward the right side of the vehicle. Each of the hanger brackets 322 is attached to a longitudinally-extending frame member (not shown) by a corresponding forward frame bracket 312 (identified individually as a first forward frame bracket 312a and a second forward frame bracket 312b). In the illustrated embodiment, the axle 316 is pivotally coupled to each of the hanger brackets 322 by a corresponding upper control arm 324 and a lower control arm 326. First and second load springs 320a and 320b, respectively, have lower portions that are attached to opposite sides of the axle 316, and upper portions that are attached to the corresponding frame member by a rear bracket 314 (identified individually as a first rear bracket 314a and a second rear bracket 314b). In the illustrated embodiments, the load springs 320 are conventional air springs well known in the art which can be inflated in a known manner to lower the lift axle 316, and deflated in a known manner for raising the lift axle 316 by means of, e.g., corresponding lift springs. In some embodiments, the lift axle system 210 can be at least generally similar in structure and function to lift axle systems described in co-pending U.S. patent application Ser. No. 15/701,369, filed Sep. 11, 2017, and titled LIFT AXLE AUXILIARY SUSPENSION SYSTEMS, now U.S. Pat. No. 10,569,814, which is incorporated herein by reference in its entirety. As those of ordinary skill in the art will appreciate, however, in other embodiments the frame brackets described herein can be used with other lift and non-lift axle systems, and are not limited to use with any particular type of system. Additionally, it will be appreciated that the lift axle systems described herein are but some examples of auxiliary suspension systems that can be mounted to vehicle frames with the brackets described herein and, accordingly, the terms "lift axle system", "auxiliary suspension system", and the like may at times be used interchangeably herein.

Referring next to FIG. 3B, the forward frame bracket 312a includes a base portion 331 and an upstanding portion 333 (which can also be referred to as an "upper portion 333" and the like). In the illustrated embodiment, the base portion 331 includes two horizontally disposed base plates 330 (identified individually as a first base plate 330a and a second base plate 330b) and two vertically disposed flanges 332 (identified individually as a first flange 332a and a second flange 332b) extending downwardly on opposite end portions thereof. The upstanding portion 333 includes a vertically disposed back plate 328 that extends upwardly from the horizontally disposed base plates 330 and is supported on opposite ends thereof by corresponding gussets 335. In the illustrated embodiment, a horizontally disposed flange 337 extends inwardly from the back plate 328 generally opposite the base plates 330. In the illustrated embodiment, each of the base plates 330 includes an outer edge portion 352 that has a series of graduated steps 350. More specifically, the steps 350 (which can also be referred to as tiered or offset edge portions) can be spaced apart from each other by relatively small increments (e.g., equal increments) in the direction of the lateral axis S. For example, in some embodiments the increments can be from about 0.02 inch to about 0.5 inch, or about 0.05 inch to about 0.25 inch, or about 0.1 inch. Additionally, in the illustrated embodiment the steps 350 on each of the base plates 330a and 330b are mirror images of each other so that the corresponding steps are aligned with each other in the longitudinal direction L.

The forward frame bracket 312a can be fixedly attached to the hanger bracket 322a by a pair of threaded studs 336 (identified individually as a first threaded stud 336a and a second threaded stud 336b) that project upwardly from an upper surface 338 of the hanger bracket 322a. In some embodiments, the studs 336 extend through holes in the base plates 330 that are oversized in at least one direction. For example, in the illustrated embodiment the studs 336 extend through elongated holes 334 (identified individually as a first elongated hole 334a and a second elongated hole 334b) in the base plates 330 and threadably receive corresponding nuts 344. In the illustrated embodiment, the forward frame bracket 312a is also attached to the hanger bracket 322a by a pair of fasteners, e.g., bolts 342 that extend through elongated holes 340 (identified individually as a first elongated hole 340a and a second elongated hole 340b) in the vertical flange 332 on each end of the frame bracket 312 and threadably engage nut plates 346 on the inside of the hanger bracket 322a. As illustrated in FIG. 3B, each of the elongated holes 340 and 334 are elongated in the direction of the lateral axis S. For example, the holes 340 and 334 can be elongated from about 0.1 inch to about 1 inch or more, or from about 0.2 inch to about 0.75 inch. This enables the lift axle system 210 to be moved to the left or right if needed to align or otherwise adjust the position of the lift axle 316 relative to the vehicle frame before the nuts 344 and the bolts 342 have been fully tightened.

In the illustrated embodiment, the rear frame bracket 314a is a two-piece bracket having a base portion 361 and an upstanding portion 363 (which can also be referred to as an "upper portion 363" and the like). The base portion 361 includes a horizontally disposed base plate 360 having a first air valve notch 368 toward an inboard side and a second air valve notch 370 toward the opposite outboard side. Additionally, the base plate 360 includes two countersunk holes 366 (identified individually as a first countersunk hole 366a and a second countersunk hole 366b) configured to receive countersunk fasteners 364 (e.g., screws, such as flush head screws) that extend through the holes 366 and engage threaded bores 378 (identified individually as a first threaded bore 378a and a second threaded bore 378b) in a top plate 380 of the load spring 320a to secure the base plate 360 to the top plate 380. The base plate 360 further includes square holes 374 (identified individually as a first square hole 374a and a second square hole 374b) which are countersunk on the backside of the base plate 360. The square holes 374 are configured to receive countersunk fasteners 382 (e.g., screws, such as flush head screws; identified individually as a first countersunk fastener 382a and a second countersunk fastener 382b) which are trapped between the base plate 360 and the top plate 380 and extend upwardly through the square holes 374. The countersunk fasteners 382 can have square shoulders under the heads (similar to a typical carriage bolt) that fit snugly into the square holes 374 to resist turning when nuts 384 are installed and torqued. In other embodiments, the fasteners 382 can be replaced by threaded studs that are welded directly to the plate 360 or to the plate 380, or by other types of similarly oriented fasteners that do not protrude below the bottom surface of the base plate 360.

In the illustrated embodiment, the upstanding portion 363 of the rear frame bracket 314a includes a vertically disposed back plate 362 that extends upwardly from two horizontally disposed base plates 386 (identified individually as a first base plate 386a and a second base plate 386b). The base plates 386 are separated by a gap 388 and are reinforced by gussets 390 that extend upwardly between the base plates 386 and the back plate 362. Each of the base plates 386 includes a through hole 376 (identified individually as a first through hole 376a and a second through hole 376b) configured to receive one of the fasteners 382. In the illustrated embodiments, the forward frame brackets 312a and 312b are identical, or at least substantially identical, to each other, and the rear frame brackets 314a and 314b are identical, or at least substantially identical, to each other. The forward frame brackets 312 and the rear frame brackets 314 can be manufactured using suitable materials and methods well known to those of ordinary skill in the art. For example, in some embodiments the frame brackets 312 and 314 can be manufactured from steel plate that is cut and formed to shape and then welded together along abutting edge portions. In other embodiments, it is contemplated that the frame brackets can be manufactured from other materials using other suitable methods known in the art, such as by machining the brackets from, for example, steel or aluminum castings, forgings, etc.

Figure 4A:
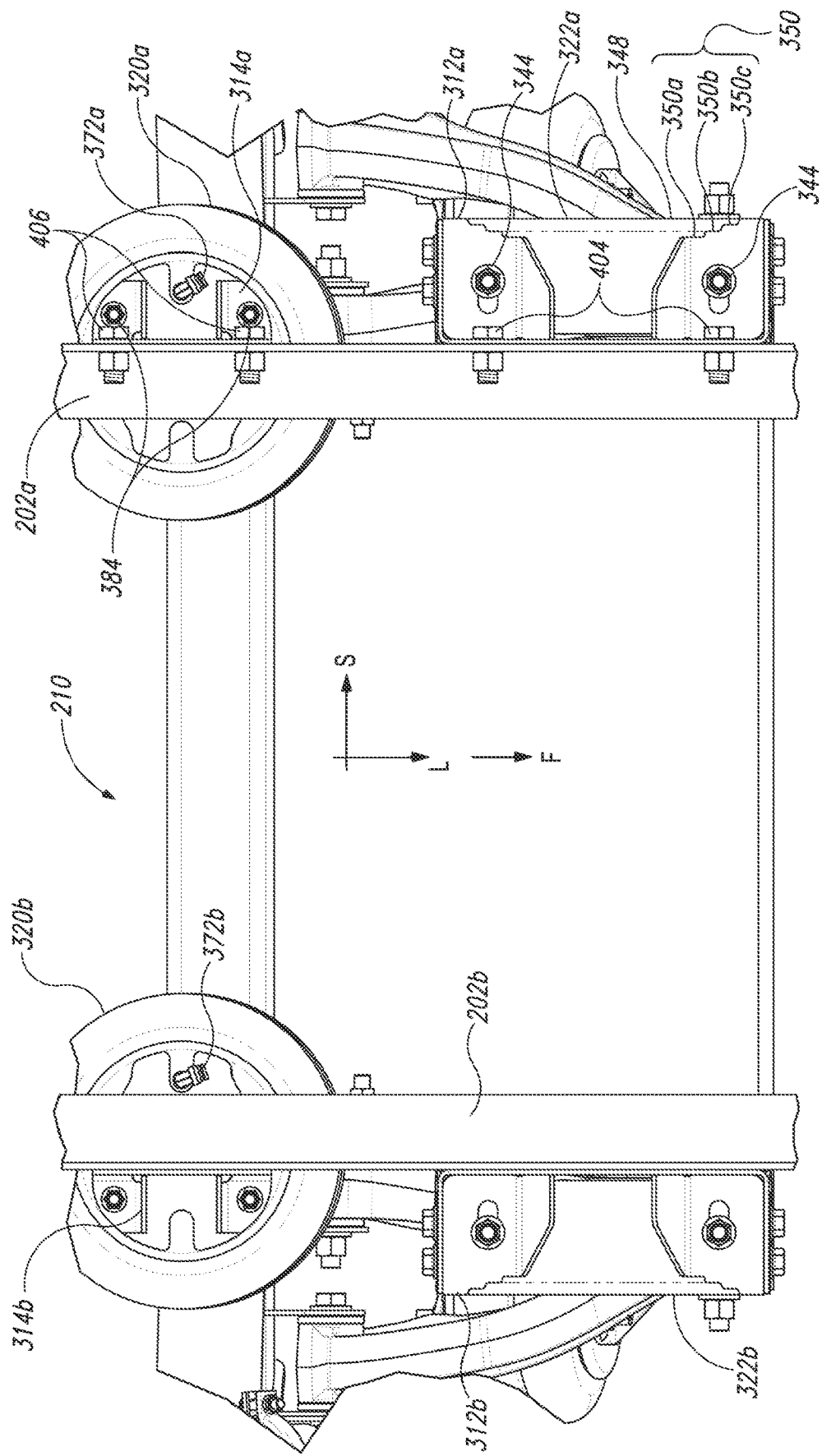
FIGS. 4A and 4B are top and front views, respectively, of a lift axle system attached to a vehicle frame with the frame brackets of FIGS. 3A and 3B.
Figure 4B:
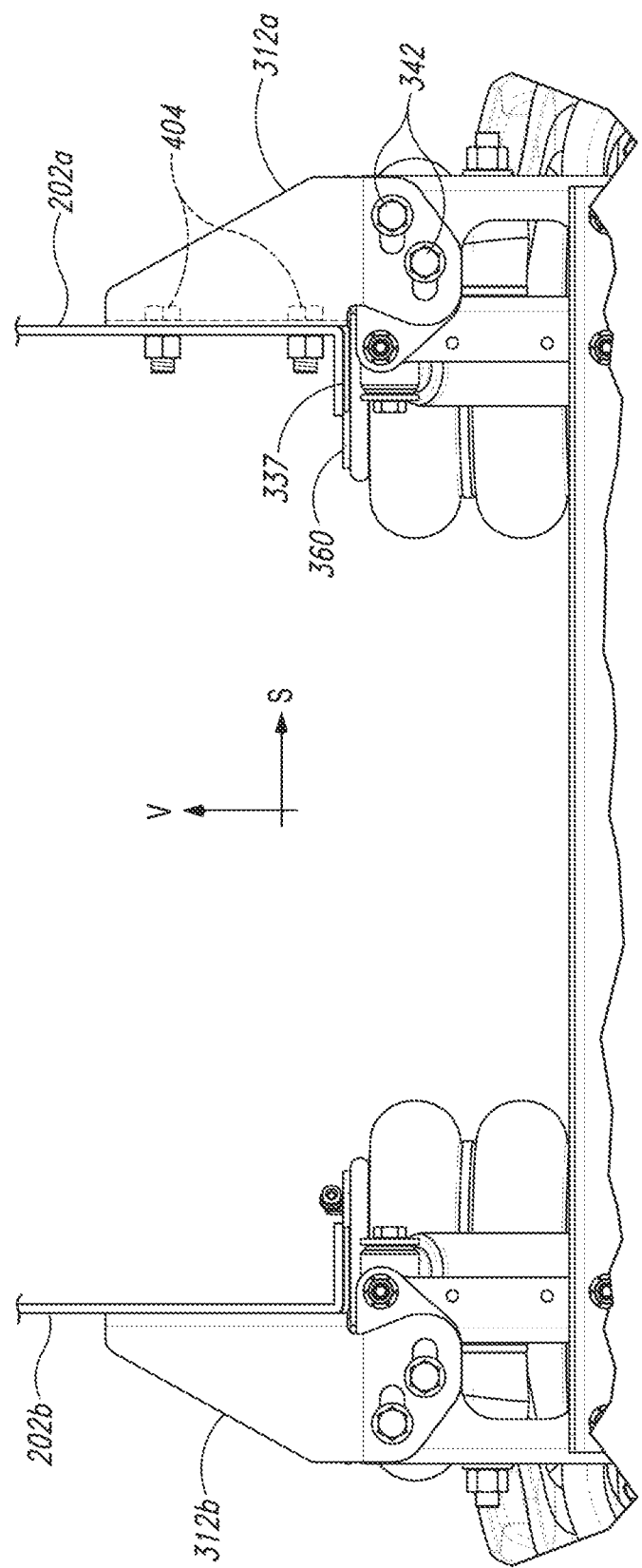

FIG. 4A is a top view, and FIG. 4B is a corresponding front view of the lift axle system 210 mounted to the vehicle frame members 202a and 202b with the forward brackets 312 and the rear brackets 314 in accordance with an embodiment of the present technology. Referring to FIGS. 3A-4B together, to install the lift axle system 210 on the vehicle chassis, the forward frame brackets 312 are attached to the corresponding hanger brackets 322 in such a way that the lift axle 210 will be able to move back and forth parallel to the lateral axis S to adjust the position of the lift axle system 210 relative to the frame members 202. This is accomplished by positioning the forward frame brackets 312 on the corresponding hanger brackets 322 such that the threaded studs 336 extend upwardly through the elongated holes 334, and then installing the nuts 344 on the studs 336 and installing the bolts 342 through the elongated holes 340 to engage the corresponding nut plates 346. Then the nuts 344 and the bolts 342 can be tightened enough to remove any appreciable gaps between the forward frame brackets 312 and the hanger brackets 322, but still permit side to side movement of the hanger bracket 322 relative to the frame bracket 312 by means of the elongated holes 340 and 334.

Once the forward frame brackets 312 have been installed on the corresponding hanger brackets 322 in this manner, the frame brackets 312 can be fixedly attached to the frame members 202 by positioning the horizontal flanges 337 of the respective frame brackets 312 against the lower flanges of the corresponding frame members 202 and installing a plurality of fasteners 404 (e.g., bolts, Huck fasteners, etc.; FIGS. 4A and 4B). More specifically, the vertically disposed back plates 328 of the forward frame brackets 312 can include a plurality of pre-existing holes configured to receive the fasteners 404, and these holes can be used to locate new holes in the frame members 202 for the fasteners 404. Alternatively, both parts can have pre-drilled holes positioned to receive the fasteners 404, or both parts can initially be blank and the fastener holes can be match drilled in situ. In other embodiments, the brackets 312 can be welded to the frame members 202. Either way, once the forward frame brackets 312 have been bolted or otherwise fastened to the corresponding frame members 202, the lateral position of the lift axle system 210 can be adjusted by virtue of the elongated holes 340 and 334 as necessary to center or otherwise align the lift axle system 210 with respect to the frame members 202. The elongated holes 340 and 334 also enable the frame brackets 312 to accommodate different vehicle frame widths. Moreover, the person installing the lift axle system 210 can verify that the lift axle system 210 is properly aligned by visually inspecting the relative positions of the graduated steps 350 with respect to the vertical surface 348 of the corresponding hanger bracket 322. More specifically, referring to FIG. 4A, if the graduated steps 350 include a series of three steps 350a-350c, then the position of the steps 350 relative to the vertical surface 348 should be the same (e.g., equal, or at least approximately equal) on both sides of the vehicle. For example, if the third step 350c of the first frame bracket 312a is flush with the vertical surface 348 on the left side of the vehicle, then the third step 350c on the second frame bracket 312a should also be flush (or at least approximately flush) with the corresponding vertical surface 348 to ensure that the lift axle system 210 is properly aligned (e.g., centered) with respect to the frame members 202. If not, the lift axle system 210 should be moved in the lateral direction as required to center the hanger brackets 322 with respect to the corresponding frame brackets 312 before fully tightening the nuts 344 and the bolts 342. The visual alignment aid provided by the stepped-edge feature can eliminate the need for potentially difficult measurements. Additionally, in some embodiments providing the stepped-edge feature in the frame brackets 312 can eliminate the need to provide special alignment features on the hanger brackets 322. Accordingly, it is contemplated that, in some embodiments, the frame brackets 312 can be used to facilitate alignment of a wide variety of auxiliary suspension systems having a variety of different hanger bracket configurations.

Figure 7A:
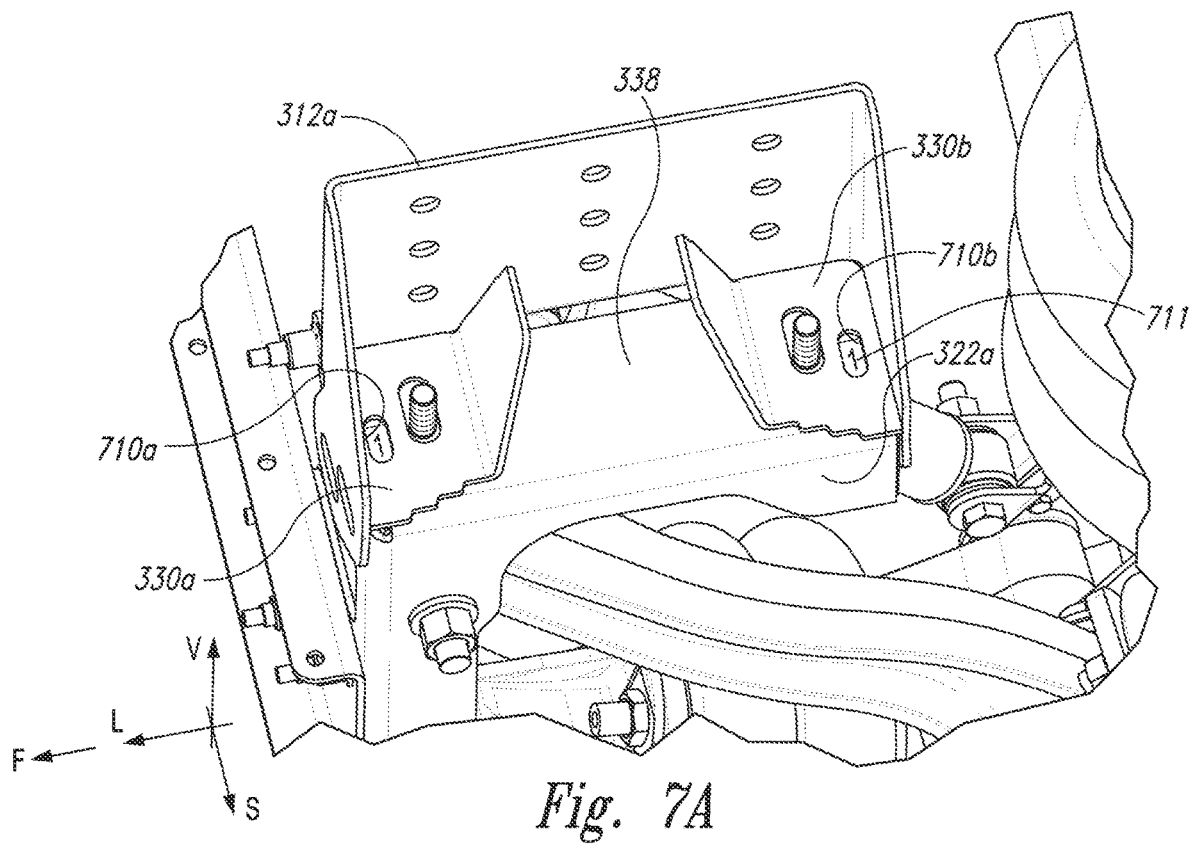
FIGS. 7A and 7B are isometric views of portions of auxiliary suspension mounting systems configured in accordance with further embodiments of the present technology.
Figure 7B:
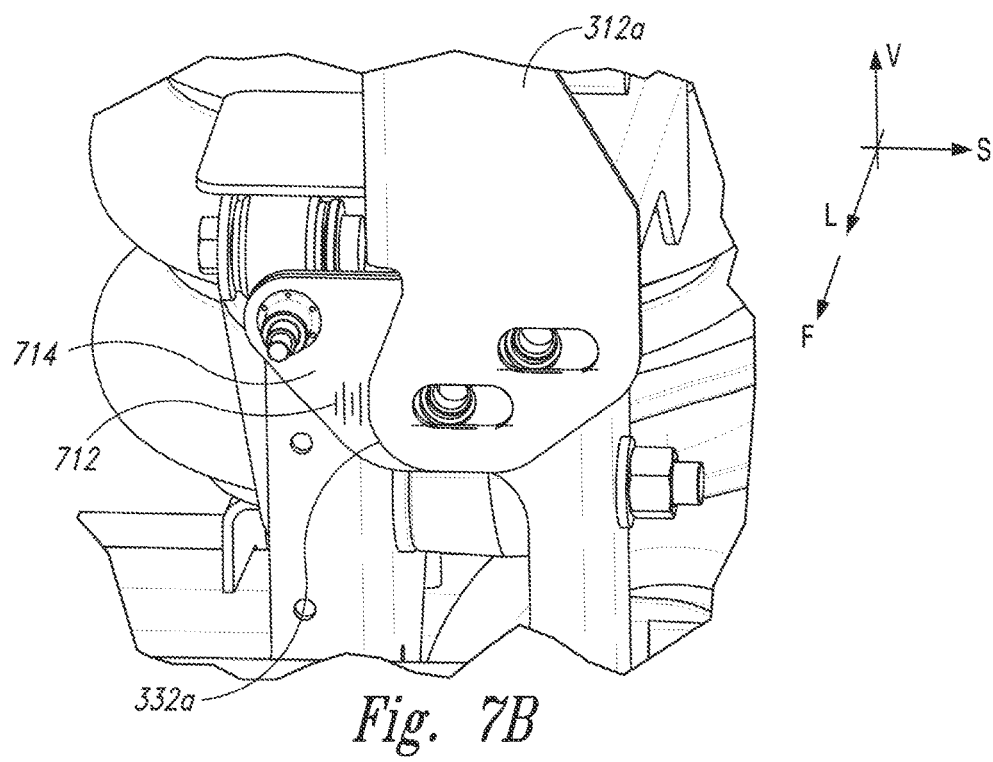

In other embodiments, the frame brackets 312 and/or the hanger brackets 322 can include other features to facilitate visual alignment of the lift axle system 210. For example, FIG. 7A is an outboard isometric view, and FIG. 7B is a front isometric view, of other embodiments of the frame bracket 312. As shown in FIG. 7A, in some embodiments one or both of the base plates 330a and 330b can include one or more holes 710a and 710b that are positioned over markings 711 (e.g., numbers, letters, etc.), grooves, or other features formed on or in the upper surface 338 of the hanger bracket 322. During installation, the person or persons installing the lift axle system 210 can confirm proper alignment by visually confirming that the features 711 on the upper surfaces 338 of the respective hanger brackets 322 which show through the holes 710 in the corresponding frame bracket base plates 330 are in the same relative position on both sides. In further embodiments, as shown in FIG. 7B, a front and/or rear vertical surface 714 of the hanger brackets 322 can include a series of graduated marks 712 or other features that facilitate side-to-side alignment of the lift axle system 210 by visual comparison to corresponding features (e.g., the edges of the flanges 332) of the frame brackets 312.

Returning to FIGS. 3A-4B, for ease of understanding, attachment of the load springs 320 to the frame members 202 is described below with respect to the first load spring 320a, with the understanding the same process applies to attachment of the second load spring 320b. To attach the first load spring 320a to the first frame member 202a, the base portion 361 of the rear frame bracket 314a is separated from the upper portion 363, and the base plate 360 is positioned on the top plate 380 of the load spring 320a with the fasteners 382 extending upwardly through the square holes 374 (FIG. 3B). The base plate 360 is positioned so that an air valve 372a is located in the notch 370 or, in the case of the second load spring 320b which has an air valve 372b positioned on the inboard side of the second frame member 202b, the air valve 372b is positioned in the notch 368. Accordingly, the rear frame bracket 314a is able to accommodate a load spring having an air valve on either the inboard or outboard side of the corresponding frame member. Next, the countersunk fasteners 364 are inserted through the holes 366 and engaged with the threaded holes 378 in the top plate 380 to fixedly attach the base portion 361 to the top plate 380. The upstanding portion 363 of the rear frame bracket 314a can then be attached to the base portion 361 by positioning the base plates 386 on top of the base plate 360 so that the fasteners 382 extend upwardly through the holes 376. The nuts 384 are then threadably installed onto the fasteners 382 and can be tightened to full torque.

The rear frame bracket 314a can then be fixedly attached to the frame member 202a by positioning the base portion 361 against the lower flange of the frame member 202a and installing one or more fasteners, e.g., bolts 406 through the back plate 362 and the frame member 202a as shown in FIGS. 4A and 4B. More specifically, although not shown in FIG. 3A or 3B, the rear frame bracket 314a can include a plurality of pre-drilled holes that can be used to locate corresponding holes in the frame member 202a for receiving the bolts 406. In other embodiments, both the rear frame bracket 314a and the frame member 202a can have pre-drilled holes, or both of these structural elements may be undrilled until installation and then matched drilled in situ. With either approach, the back plate 362 is fixedly bolted otherwise fixedly attached to the frame member 202a to securely attach the upper portion of the load spring 320a to the frame member 202a. Because the fasteners 364 of this embodiment are countersunk, the heads of the fasteners 364 do not interfere with the lower flange of the frame member 202a when the base portion 361 is positioned against the lower flange of the frame member 202a.

As noted above, one advantage of the rear frame brackets 314 is that the load springs 320 can be removed and replaced without having to detach the upstanding portions 363 of the frame brackets 314 from the frame members 202. For example, if the load spring 320a needs to be removed for maintenance or replacement after the lift axle system 210 has been in service, the nuts 384 can be removed from the fasteners 382 so that the base portion 361 of the frame bracket 314a can be separated from the upstanding portion 363 while the upstanding portion 363 remains fixedly attached to the frame member 202a. This enables the upper portion of the load spring 320a to be moved downwardly and away from with the frame member 202a for removal from the lift axle 316. As can be seen with reference to FIGS. 3B and 4A, the nuts 384 should be easily accessible by a person working in the proximity of the lift axle system 210. Once the upper portion of the load spring 320a has been detached from the upstanding portion 363 of the frame bracket 314a, the lower portion of the load spring 320a can be detached from the axle 316 in a known manner and removed, and a new load spring 320a can then be installed by reversing the foregoing process. Although some conventional designs may enable a load spring to be removed without detaching the frame bracket from frame member, these designs may have limitations. For example, conventional designs that utilize two studs to attach the load spring to the frame bracket (one outboard of the frame member and one inboard) may require notching of the lower flange of the frame member to clear the inboard stud. Embodiments of the present technology, however, can be used with wide flange frame members without this limitation.

Figure 5A:
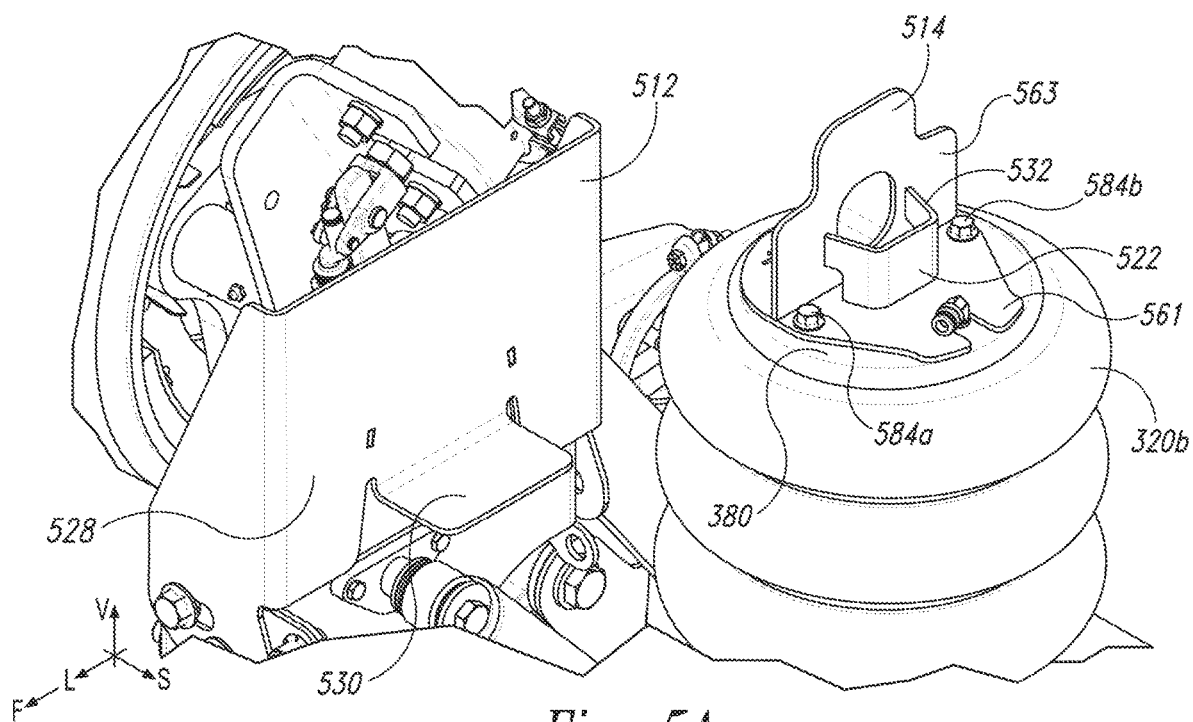
FIGS. 5A and 5B are inboard and outboard isometric views, respectively, of forward and aft lift axle frame brackets configured in accordance with another embodiment of the present technology.
Figure 5B:
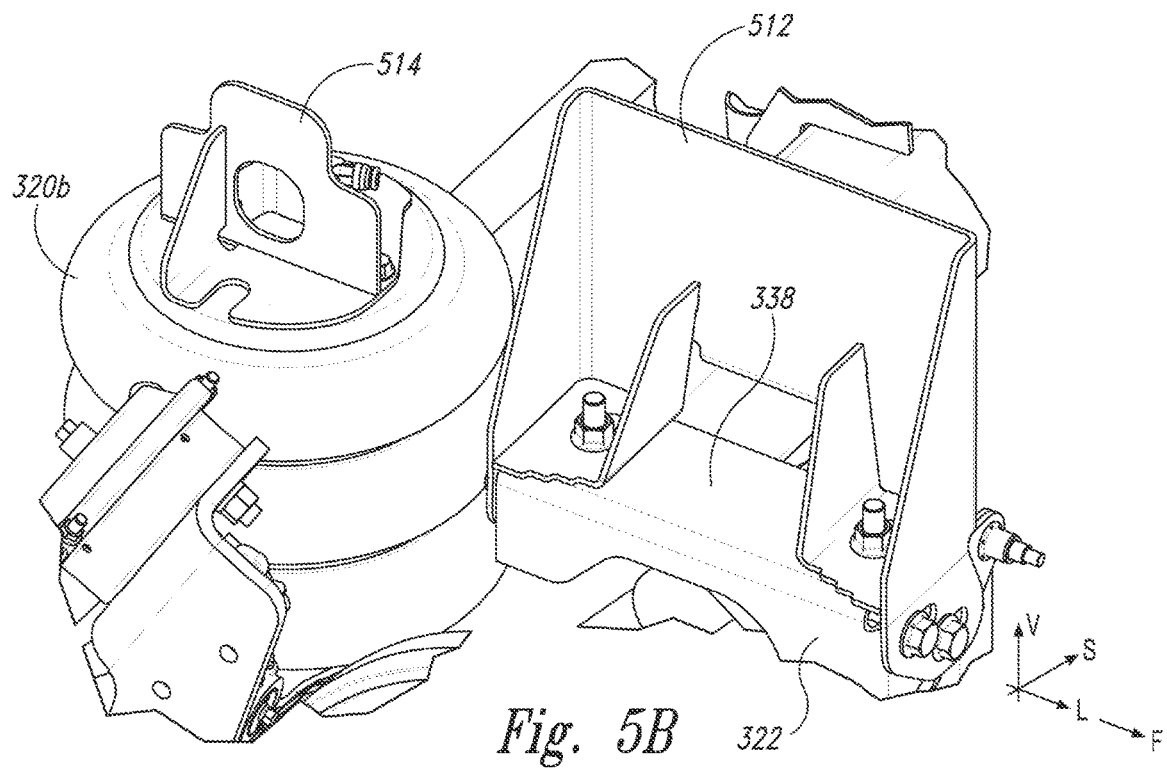

FIGS. 5A and 5B are right side (i.e., passenger side) inboard and outboard isometric views, respectively, of a forward frame bracket 512 and a rear frame bracket 514 configured in accordance with other embodiments of the present technology. Referring to FIGS. 5A and 5B together, the forward frame bracket 512 can be at least generally similar in structure and function to the forward frame bracket 312 described in detail above. In the illustrated embodiment, however, the forward frame bracket 512 includes a horizontally disposed flange 530 that is configured to be spaced above the upper surface 338 of the hanger bracket 322. The rear frame bracket 514 is at least generally similar in structure and function to the rear frame bracket 314 described in detail above. However, in the illustrated embodiment the rear frame bracket 514 is a "one-piece" rear frame bracket in which an upstanding portion 563 is permanently attached (e.g., by welding) to a base portion 561. Additionally, in the illustrated embodiment the rear frame bracket 514 includes a vertically disposed riser 522 having an upper edge portion 532 that is configured to be spaced above the upper surface of the load spring top plate 380.

As can be seen with reference to, for example, FIG. 4B, the frame brackets 312 and 314 described in detail above are configured for use when the upper surfaces 338 of the hanger brackets 322 and the top plates 380 of the load springs 320 are to be positioned in contact with, or at least relatively close to, the lower horizontal flange of the corresponding frame member 202. In other applications, for example, in other applications in which the vehicle has a higher frame height and/or may be using smaller wheels on the axle, it may be desirable to position the lift axle system 210 below the lower flange of the frame members 202 by a selected distance, such as a distance ranging from about 1 inch to about 12 inches, or various distances therebetween. In such embodiments, the frame brackets 512 and 514 illustrated in FIGS. 5A and 5B can be used by positioning the flange 530 and the upper edge portion 532 against the lower flange of, e.g., the frame member 202b (FIG. 4B) before bolting the forward frame bracket 512 and the rear frame bracket 514 to the frame member 202b. Because the riser 522 provides space between the lower flange of the frame member 202b and the base portion 561, a person can easily access bolts 584a and 584b to disconnect the upper portion of the load spring 320b from the rear frame bracket 514 without having to disconnect the rear frame bracket 514 from the frame member 202b. Accordingly, for this reason in some embodiments the rear frame bracket 514 does not have to be a two-piece frame bracket like the frame bracket 314 described in detail above. However, in some embodiments, it may be advantageous for the frame bracket 514 to be in two-piece form like the frame bracket 314 to, for example, provide better tool access to fasteners. Although FIGS. 5A and 5B illustrate the forward frame bracket 512 and the rear frame bracket 514 as used on the right side (passenger side) of the vehicle, the same brackets can be used on the left side of the vehicle by simply reversing their direction.

Figure 6:
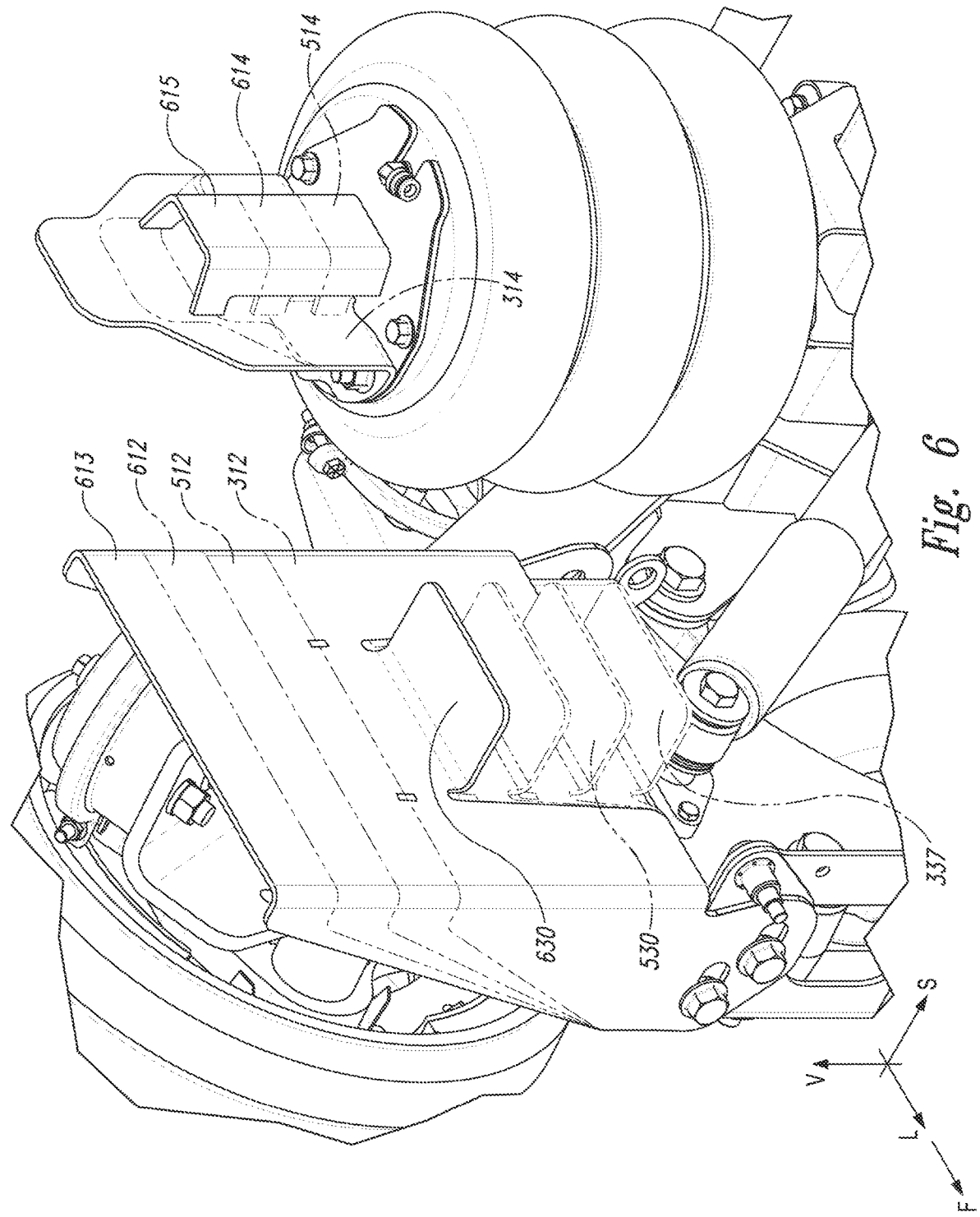
FIG. 6 is an inboard isometric view illustrating a range of different sized forward and aft lift axle frame brackets configured in accordance with other embodiments of the present technology.

FIG. 6 illustrates an inboard isometric view of forward frame brackets 612 and 613 superimposed on the forward frame brackets 312 and 512 described in detail above to illustrate how the same basic forward frame bracket can be used to accommodate a variety of different vertical positions of a lift axle system relative to the vehicle frame. Similarly, FIG. 6 also illustrates rear frame brackets 614 and 615 superimposed on the rear frame brackets 314 and 514 described above to further illustrate how this type of rear frame bracket can be used to accommodate a variety of lift axle mounting elevations.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. An auxiliary suspension system for use with a vehicle having a frame, the auxiliary suspension system comprising:
 a load spring;
 a bracket configured to operably couple the load spring to the frame, wherein the bracket includes
  a first portion configured to be fixedly attached to an upper portion of the load spring; and
  a second portion configured to be fixedly attached to the frame and removably attached to the first portion, wherein the first portion is configured to be detached from the second portion and subsequently reattached to the second portion while the first portion remains fixedly attached to the load spring and the second portion remains fixedly attached to the frame;
 one or more first fasteners configured to be engaged with both the first portion of the bracket and the upper portion of the load spring to fixedly attach the first portion of the bracket to the upper portion of the load spring; and
 one or more second fasteners configured to be engaged with both the first portion of the bracket and the second portion of the bracket to removably attach the first portion of the bracket to the second portion of the bracket, wherein the one or more second fasteners are further configured to be disengaged from at least one of the first portion of the bracket or the second portion of the bracket to release the second portion of the bracket from the first portion of the bracket while the one or more first fasteners remain engaged with both the first portion of the bracket and the upper portion of the load spring to fixedly attach the first portion of the bracket to the upper portion of the load spring.

2. The auxiliary suspension system of claim 1:
wherein the first portion of the bracket includes a horizontally disposed base plate configured to receive the one or more first fasteners for fixedly attaching the base plate to the upper portion of the load spring, and
wherein the second portion of the bracket includes a vertically disposed back plate configured to receive one or more third fasteners for fixedly attaching the back plate to the frame.

3. The auxiliary suspension system of claim 2:
wherein the base plate of the first portion is a first base plate, and
wherein the second portion of the bracket further includes a second horizontally disposed base plate configured to receive the one or more second fasteners for removably attaching the second base plate to the first base plate.

4. The auxiliary suspension system of claim 1 wherein the upper portion of the load spring includes a top plate having one or more threaded holes, and wherein the one or more first fasteners are configured to threadably engage the one or more threaded holes.

5. The auxiliary suspension system of claim 4 wherein the one or more first fasteners are countersunk fasteners.

6. The auxiliary suspension system of claim 1:
wherein the load spring is an air spring having an air fitting extending from the upper portion,
wherein the first portion of the bracket includes a horizontally disposed base plate having an opening, and
wherein the air fitting is positioned within the opening when the base plate is fixedly attached to the upper portion of the load spring.

7. The auxiliary suspension system of claim 1:
wherein the first portion of the bracket is configured to receive the one or more first fasteners to fixedly attach the first portion of the bracket to the upper portion of the load spring, and
wherein the first portion of the bracket is further configured to receive the one or more second fasteners to removably attach the first portion of the bracket to the second portion of the bracket.

8. The auxiliary suspension system of claim 7 wherein the load spring includes a top plate, and wherein the first portion of the bracket includes a lower surface configured to fit flush against an upper surface of the top plate.

9. An auxiliary suspension system for use with a vehicle having a frame, the auxiliary suspension system comprising:
a load spring; and
a bracket configured to operably couple the load spring to the frame, wherein the bracket includes a first portion configured to be fixedly attached to an upper portion of the load spring; and
a second portion configured to be fixedly attached to the frame and removably attached to the first portion, wherein the first portion is configured to be detached from the second portion and subsequently reattached to the second portion while the first portion remains fixedly attached to the load spring and the second portion remains fixedly attached to the frame, wherein the first portion is configured to receive one or more first fasteners to fixedly attach the first portion to the upper portion of the load spring, wherein the first portion is further configured to receive one or more second fasteners to removably attach the first portion to the second portion, and wherein the one or more second fasteners are countersunk fasteners configured to extend upwardly through one or more corresponding countersunk holes in the first portion.

10. The auxiliary suspension system of claim 9 wherein the first portion of the bracket includes a horizontally disposed base plate configured to receive the one or more first fasteners to fixedly attach the first portion to the upper portion of the load spring.

11. The auxiliary suspension system of claim 10 wherein the second portion of the bracket includes a vertically disposed back plate configured to receive one or more third fasteners to fixedly attach the second portion to the frame.

12. The auxiliary suspension system of claim 10:
wherein the base plate of the first portion of the bracket is a first base plate, and
wherein the second portion of the bracket further includes a second horizontally disposed base plate configured to receive the one or more second fasteners to removably attach the second base plate to the first base plate.

13. The auxiliary suspension system of claim 9 wherein the upper portion of the load spring includes a top plate having one or more threaded holes, and wherein the one or more first fasteners are configured to threadably engage the one or more threaded holes.

14. The auxiliary suspension system of claim 9:
wherein the load spring is an air spring having an air fitting extending from the upper portion,
wherein the first portion of the bracket includes a horizontally disposed base plate having an opening, and
wherein the air fitting is positioned within the opening when the first portion of the bracket is fixedly attached to the upper portion of the load spring.

15. An auxiliary suspension system for use with a vehicle having a frame, the auxiliary suspension system comprising:
a load spring; and
a bracket configured to operably couple the load spring to the frame, wherein the bracket includes
a first portion configured to be fixedly attached to an upper portion of the load spring; and
a second portion configured to be fixedly attached to the frame and removably attached to the first portion, wherein the first portion is configured to be detached from the second portion and subsequently reattached to the second portion while the first portion remains fixedly attached to the load spring and the second portion remains fixedly attached to the frame, wherein the first portion includes one or more threaded studs extending upwardly and away from the upper portion of the load spring, and wherein the one or more threaded studs are configured to receive one or more corresponding threaded elements to removably attach the first portion to the second portion.

16. The auxiliary suspension system of claim 15:
wherein the first portion of the bracket includes a horizontally disposed base plate configured to receive one or more first fasteners to fixedly attach the base plate to the upper portion of the load spring, and
wherein the second portion of the bracket includes a vertically disposed back plate configured to receive one or more second fasteners to fixedly attach the back plate to the frame.

17. The auxiliary suspension system of claim 16:
wherein the base plate of the first portion of the bracket is a first base plate, and
wherein the second portion of the bracket further includes a second horizontally disposed base plate configured to receive the one or more threaded studs to removably attach the first base plate to the second base plate.

18. A multi-piece bracket for removably coupling a load spring of an auxiliary suspension system to a frame of a vehicle, the bracket comprising:
- a first portion configured to be fixedly attached to an upper portion of the load spring;
- a second portion configured to be fixedly attached to the frame and removably attached to the first portion, wherein the first portion is configured to be detached from the second portion and subsequently reattached to the second portion while the first portion remains fixedly attached to the load spring and the second portion remains fixedly attached to the frame;
- one or more first fasteners configured to be engaged with both the first portion of the bracket and the upper portion of the load spring to fixedly attach the first portion of the bracket to the upper portion of the load spring; and
- one or more second fasteners configured to be engaged with both the first portion of the bracket and the second portion of the bracket to removably attach the first portion of the bracket to the second portion of the bracket, wherein the one or more second fasteners are further configured to be disengaged from at least one of the first portion of the bracket or the second portion of the bracket to release the second portion of the bracket from the first portion of the bracket while the one or more first fasteners remain engaged with both the first portion of the bracket and the upper portion of the load spring.

19. The multi-piece bracket of claim 18:
wherein the first portion of the bracket includes a first plate configured to receive the one or more first fasteners for fixedly attaching the first portion of the bracket to the upper portion of the load spring, and
wherein the second portion of the bracket includes a second plate configured to receive one or more third fasteners for fixedly attaching the second portion of the bracket to the frame.

20. The multi-piece bracket of claim 19:
wherein the first plate is a first horizontally disposed plate,
wherein the second plate is a vertically disposed plate, and
wherein the second portion of the bracket further includes a second horizontally disposed plate configured to receive the one or more second fasteners for removably attaching the second horizontally disposed plate to the first horizontally disposed plate.

* * * * *

UNITED STATES PATENT AND TRADEMARK OFFICE
CERTIFICATE OF CORRECTION

PATENT NO. : 11,904,963 B2
APPLICATION NO. : 17/956684
DATED : February 20, 2024
INVENTOR(S) : Dale E. Jacobsma et al.

Page 1 of 1

It is certified that error appears in the above-identified patent and that said Letters Patent is hereby corrected as shown below:

In the Specification

In Column 1, Line 66, delete "Holstein" and insert -- Hulstein -- therefor.

Signed and Sealed this
Twenty-fifth Day of March, 2025

Coke Morgan Stewart
*Acting Director of the United States Patent and Trademark Office*